United States Patent
Tzuang et al.

(10) Patent No.: US 11,874,404 B2
(45) Date of Patent: Jan. 16, 2024

(54) MULTI-CHIRP PRE-DISTORTED LASER LINEARIZATION FOR FMCW LIDAR

(71) Applicant: Voyant Photonics, Inc., New York, NY (US)

(72) Inventors: Lawrence D. Tzuang, New York, NY (US); Daniel E. Bush, New York, NY (US); Christopher T. Phare, New York, NY (US)

(73) Assignee: Voyant Photonics, Inc.

( * ) Notice: Subject to any disclaimer, the term of this patent is extended or adjusted under 35 U.S.C. 154(b) by 267 days.

(21) Appl. No.: 17/375,597

(22) Filed: Jul. 14, 2021

(65) Prior Publication Data

US 2023/0014034 A1   Jan. 19, 2023

(51) Int. Cl.
*G01C 3/08* (2006.01)
*G01S 7/4915* (2020.01)
*G01S 17/34* (2020.01)

(52) U.S. Cl.
CPC ............ *G01S 7/4915* (2013.01); *G01S 17/34* (2020.01)

(58) Field of Classification Search
None
See application file for complete search history.

(56) References Cited

U.S. PATENT DOCUMENTS

| | | | |
|---|---|---|---|
| 7,742,152 B2 * | 6/2010 | Hui | G01S 17/34 356/5.1 |
| 8,229,679 B1 | 7/2012 | Matthews | |
| 2008/0018881 A1 | 1/2008 | Hui et al. | |
| 2012/0082414 A1 | 4/2012 | Sakamaki et al. | |
| 2013/0242400 A1 | 9/2013 | Chen | |
| 2020/0256994 A1 | 8/2020 | Crouch et al. | |
| 2021/0156999 A1 * | 5/2021 | Nishino | G01S 7/481 |
| 2021/0190474 A1 * | 6/2021 | Komatsuzaki | G01S 7/4814 |

OTHER PUBLICATIONS

International Search Report issued on corresponding PCT International Application No. PCT/US2022/035620, dated Sep. 23, 2022.
Behnam Behroozpour Baghmisheh, "Chip-scale Lidar", Technical Report No. UCB/EECS-2017-4, http://www2.eecs.berkeley.edu/Pubs/TechRpts/2017/EECS-2017-4.html, University of California at Berkeley, Jan. 19, 2017.
Xiaosheng Zhang et al., "Laser frequency sweep linearization by iterative learning pre-distortion for FMCW LiDAR", Optics Express, vol. 27, Issue 7, pp. 9965-9974, Apr. 1, 2019.

* cited by examiner

*Primary Examiner* — Mark Hellner
(74) *Attorney, Agent, or Firm* — Stratford Group Ltd.

(57) ABSTRACT

What is disclosed are systems and methods for measurement, pre-distortion, and linearization of FMCW (Frequency Modulated Continuous Wave) LiDAR chirped laser signals, in which I/Q channels of an IF optical signal of a combination of delayed and undelayed versions of the laser signal are generated and used in the process of pre-distorting waveform data for linearization.

20 Claims, 3 Drawing Sheets

MULTI-CHIRP PRE-DISTORTED LASER LINEARIZATION FOR FMCW LIDAR

FIELD OF THE INVENTION

The present disclosure relates to LiDAR (Light Detection and Ranging) instrumentation and calibration, and particularly to linearization of FMCW (Frequency Modulated Continuous Wave) LiDAR system emissions.

BRIEF SUMMARY

According to a first aspect, there is provided a system for LiDAR (light detection and ranging) chirp signal linearization including: a first splitter for splitting a chirped laser signal from a laser into two optical signals; a delay element for delaying one of the two optical signals generating a delayed optical signal, the other of the two optical signals an undelayed optical signal; and an optical 90° hybrid for receiving said undelayed and delayed optical signals, and generating a first IF optical signal output and a second IF optical signal output from said undelayed and delayed optical signals, in which said generating imparts a 90° relative IF phase shift between the first and second IF optical signal outputs, the first and second IF optical signal outputs corresponding to I/Q channels of an IF optical signal of a combination of the undelayed and delayed optical signals.

According to a second aspect, there is provided a method for LiDAR (light detection and ranging) chirp signal linearization, the method including: splitting a chirped laser signal from a laser into two optical signals; delaying one of the two optical signals generating a delayed optical signal, the other of the two optical signals an undelayed optical signal; and generating a first IF optical signal output and a second IF optical signal output from said undelayed and delayed optical signals, in which said generating imparts a 90° relative IF phase shift between the first and second IF optical signal outputs, the first and second IF optical signal outputs corresponding to I/Q channels of an IF optical signal of a combination of the undelayed and delayed optical signals.

Some embodiments further provide for an I-channel receiver and a Q-channel receiver pair for receiving the first and second IF optical signal outputs, and generating I-channel and Q-channel digital data.

Some embodiments further provide for a processing and driving circuit for receiving the I-channel and Q-channel digital data, determining an instantaneous phase of the IF optical signal from the I-channel and Q-channel digital data, pre-distorting digital chirp waveform data with use of the instantaneous phase of the IF optical signal generating new pre-distorted digital chirp waveform data for driving the laser to produce the chirped laser signal with improved linearity, and driving the laser with the new pre-distorted digital chirp waveform.

In some embodiments, the processing and driving circuit's pre-distorting the digital chirp waveform further includes: determining edges of a chirp segment; determining whether a phase error for the chirp segment is acceptable; and for a chirp segment whose phase error is not acceptable, generating said new pre-distorted digital chirp waveform data for every data point of the chirp segment.

In some embodiments, determining edges of a chirp segment includes: smoothing a copy of the instantaneous phase of the IF optical signal; determining a gradient of the smoothed copy of the instantaneous phase of the IF optical signal; and determining the edges of the chirp segment from zeros of the gradient.

In some embodiments, determining whether a phase error for the chirp segment is acceptable includes: performing a smoothing of the instantaneous phase of the IF optical signal for the chirp segment generating a smoothed instantaneous phase of the IF optical signal for every data point of the chirp segment; determining a nominal phase for every data point of the chirp segment; determining a phase error for every data point of the chirp segment with use of the nominal phase and the smoothed instantaneous phase of the IF optical signal; using a metric, assigning a single value characterizing the phase error for at least a portion of the chirp segment; and comparing the single value with an acceptability threshold, and generating said new pre-distorted digital chirp waveform data for the chirp segment includes: determining a correction factor for every data point of the chirp segment with use of the phase error; and determining new pre-distorted chirp waveform data with use of current chirp waveform data and the correction factor.

In some embodiments, smoothing the copy of the instantaneous phase of the IF optical signal includes heavy Savitzky-Golav filtering, performing the smoothing of the instantaneous phase of the IF optical signal for the chirp segment includes Savitzky-Golav filtering with no extension and a polynomial order of three, the metric is the standard deviation of a weighted phase error for at least a portion of the chirp segment, the correction factor is directly proportional to the phase error, and determining new pre-distorted chirp waveform data includes adding the current chirp waveform data to the correction factor.

In some embodiments, the optical 90° hybrid includes: respective first and second splitters for splitting each of the undelayed and delayed optical signals into respective first and second undelayed optical signals and first and second delayed optical signals; respective first and second combiners for combining the first undelayed and delayed optical signals to generate the first IF optical signal output and combining the second undelayed and delayed optical signals to generate the second IF optical signal output; and at least one phase shifter for phase shifting one or more of the first delayed optical signal, the second delayed optical signal, the first undelayed optical signal, and the second undelayed optical signal.

In some embodiments, the at least one phase shifter includes: a first phase shifter for imparting a first optical phase shift to the first undelayed optical signal; and a second phase shifter for imparting a second optical phase shift to the first delayed optical signal, in which the first optical phase shift and the second optical phase shift differ by the equivalent of a 90° relative optical phase difference.

In some embodiments, determining whether a phase error for the chirp segment is acceptable includes evaluating a convergence of the phase error for the chirp segment with use of a metric characterizing the phase error for at least a portion of the chirp segment iteration by iteration.

Some embodiments further provide for receiving the first and second IF signal outputs, and generating I-channel and Q-channel digital data.

Some embodiments further provide for receiving the I-channel and Q-channel digital data, determining an instantaneous phase of the IF optical signal from the I-channel and Q-channel digital data, pre-distorting digital chirp waveform data with use of the instantaneous phase of the IF optical signal generating new pre-distorted digital chirp waveform data for driving the laser to produce the chirped laser signal with improved linearity, and driving the laser with the new pre-distorted digital chirp waveform.

In some embodiments, generating the first IF optical signal output and the second IF optical signal output from said undelayed and delayed optical signals includes: receiving said undelayed and delayed optical signals, splitting each of the undelayed and delayed optical signals into respective first and second undelayed optical signals and first and second delayed optical signals, phase shifting one or more of the first delayed optical signal, the second delayed optical signal, the first undelayed optical signal, and the second undelayed optical signal, combining the first undelayed and delayed optical signals to generate a first IF optical signal output, and combining the second undelayed and delayed optical signals to generate a second IF optical signal output.

In some embodiments, phase shifting includes: imparting a first optical phase shift to the first undelayed optical signal; and imparting a second optical phase shift to the first delayed optical signal, in which the first optical phase shift and the second optical phase shift differ by the equivalent of a 90° relative optical phase difference.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

Figure 1:
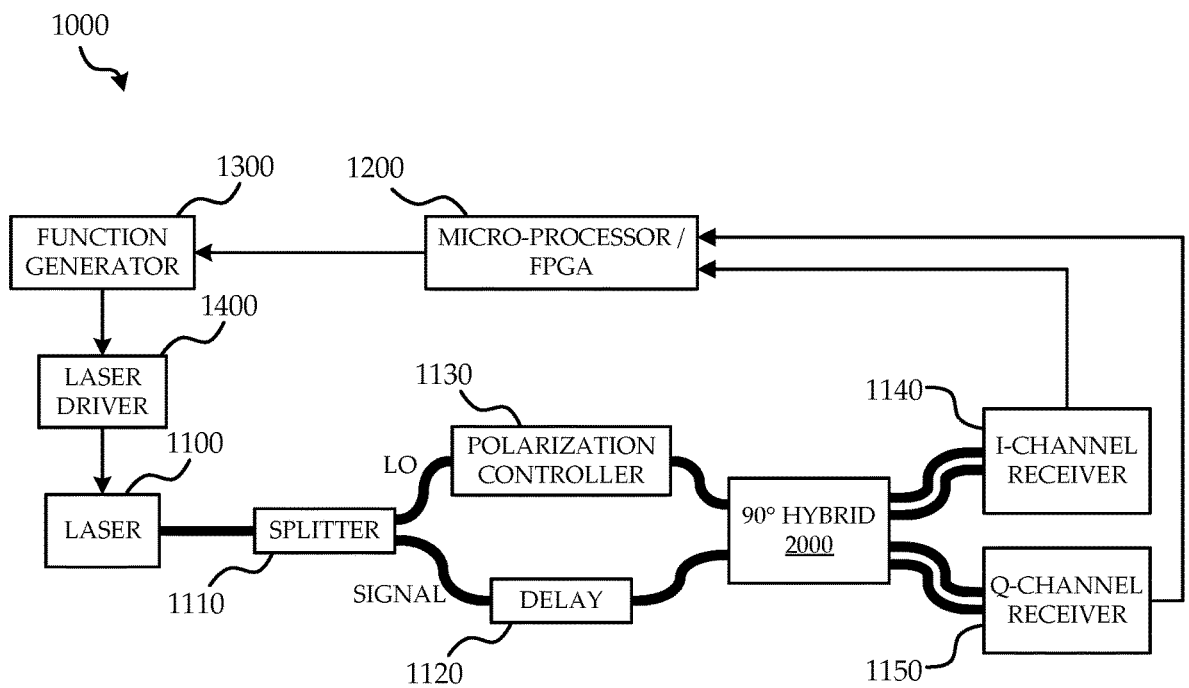
FIG. 1 is a schematic block diagram of a system employing pre-distorted laser linearization according to an embodiment.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the scope of an invention as defined by the appended claims.

DETAILED DESCRIPTION

Conventional frequency-modulated continuous-wave (FMCW) LiDAR utilizes a sequence of laser frequency sweeps which have constant slopes, referred to as a chirped laser signal and composed of linear chirp segments, to achieve a high signal-to-noise-ratio (SNR) signal for use in their detection and ranging operations. As its name implies, FMCW LiDAR generates the sequence of laser chirp segments for transmission and eventual reception, using frequency modulation of a tunable continuous wave laser. Although straightforward in theory, achieving an ideal chirped laser signal is not simple in practice. Even if the data representing the analog waveform used to drive a tunable laser is linear (hereinafter the "digital chirp waveform"), the act of modulation has associated heating and carrier injection/extraction effects that often result in non-linear chirp behaviors in the actual laser output signal. This affects the SNR and hence the accuracy of the readings generated by the FMCW LiDAR system.

Figure 4:
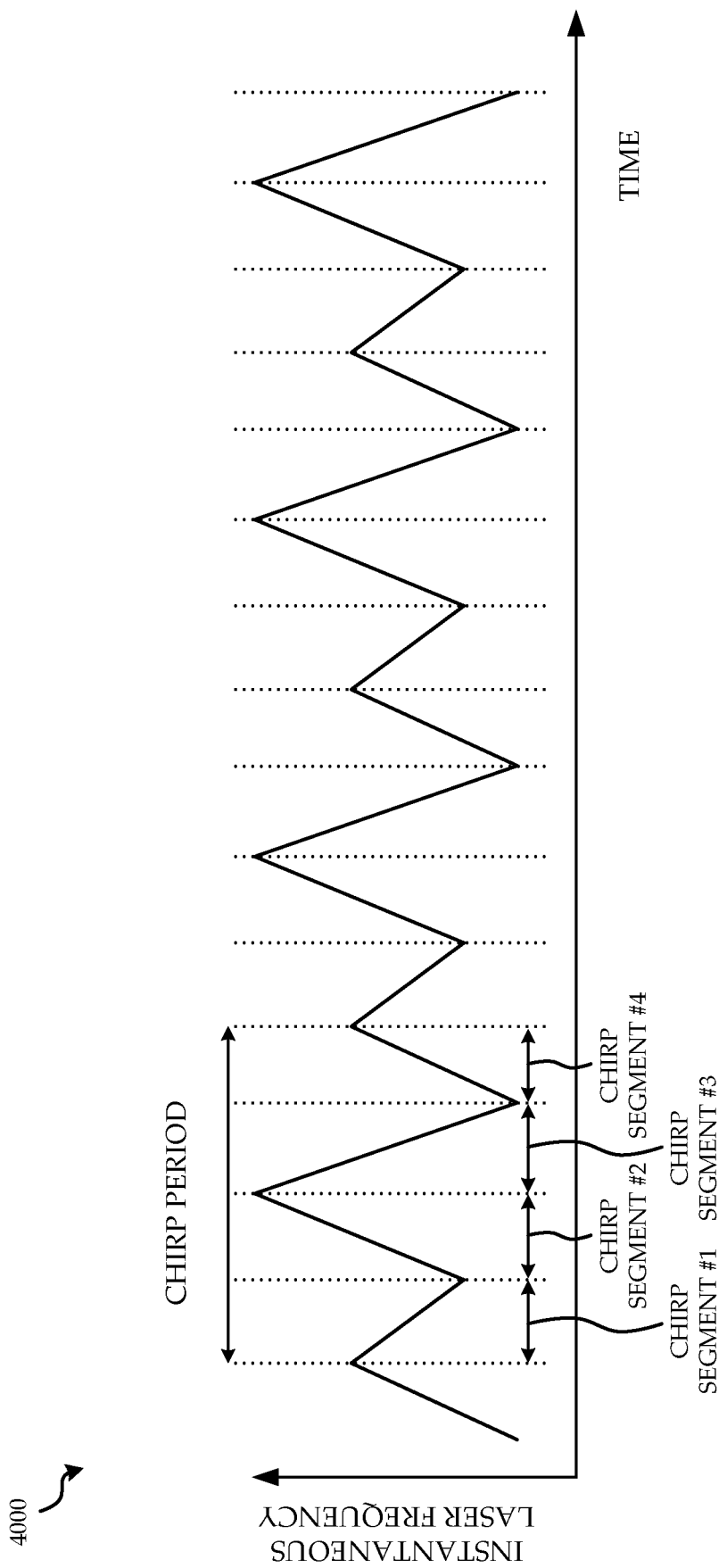
FIG. 4 illustrates an example desired repeating multi-chirp profile for laser signals emitted from a LiDAR system.

An idealized repeating chirped laser signal is depicted in FIG. 4. A predetermined sequence of chirp segments, such as chirp segments 1, 2, 3, and 4, as illustrated in FIG. 4, make up a specific finite chirp profile having a duration known as the chirp period. This chirp profile, often made up of alternating "down-chirp" and "up-chirp" segments of optionally different slopes, is continuously repeated while the LiDAR system is in operation. The LiDAR system drives the laser in a manner meant to cause the laser to emit an optical frequency which ideally varies according to that repeating linear chirped sequence. The outgoing chirped laser signal is reflected from an external object at some range, and the reflected signals are received and processed to generate information about the object, for example, about its position, shape, distance, and/or velocity. Since the accuracy and SNR of this processing generally depends upon the linearity of each of the chirp segments of the chirped laser signal, and due to the non-linearities which result from the laser not following the drive signal linearly due to electrical carrier or thermal effects, some approaches to improving accuracy involve determining and storing a "pre-distorted" digital chirp waveform constructed specifically to produce a laser chirp signal possessing less non-linearity when used to control the driving of the laser.

For clarity, the data used for modulating the laser, including the chirp segments making up the chirp profile which is used to repeatedly drive the laser, will be referred to hereinafter as the digital chirp waveform or sometimes the function generator waveform. It should be noted that since the function generator 1300, laser driver 1400, and laser 1100 may all or each operate according to proprietary signaling, data formats, and/or voltage or current levels, the units, scale, and format of the digital chirp waveform values within the function generator 1300 and laser driver 1400 likewise may be proprietary. It should be understood that reference to the "digital chirp waveform" as it resides in any of these components has been formatted and/or converted as appropriate, and in particular it should be understood that any requisite formatting and conversion required in the transfer of the digital chirp waveform from the Microprocessor/FPGA 1200 (in IF phase units as described below) to the function generator 1300 has been accordingly performed. Also, as will become apparent form the following, once a digital chirp waveform has been pre-distorted, each chirp segment thereof, although still identifiable as chirp segments, will technically no longer be linear.

Some approaches which attempt to pre-adjust the modulation to correct for non-linear chirp in the output of the laser, rely on an accurate measurement of the instantaneous laser frequency to determine the nature and magnitude of the non-linearities which need correcting. Known laser frequency estimation based on Hilbert transformation, however, is slow and inaccurate, especially near the edges where chirp segments meet, which are also the critical areas that often show the most non-linearity and hence determine the overall performance, and in particular the accuracy, of the LiDAR system. Moreover, in these approaches, the measurement noise from the receiver, the phase noise of the laser, and the modulation signal noise, which all contribute to the measured apparent non-linearity, are difficult to differentiate from the actual non-linearity of the chirp segments of the laser signal requiring correction, often leading to undesirable linearization results.

The general inability of known approaches to accurately measure the instantaneous laser frequency also prevents linearization on complicated chirp segment sequences. For example, the thermal effect on multiple up-chirp and down-chirp segments with very different chirp segment bandwidths will create asymmetric non-linear chirp segment behaviors that are obvious only near the transition edges of the chirp segments of the chirped laser signal, which as noted above, are difficult to accurately determine using known techniques.

In one known approach to chirp segment linearization, a pre-distorted modulated digital chirp waveform, derived from the offset between a predefined nominal laser frequency and an instantaneous laser frequency estimated using a Hilbert transform, was implemented on single up and down chirp segments. The resulting residual non-linear noise, however, was still high and impractical for long range LiDAR systems.

With reference to FIG. 1, an example LiDAR chirp linearization system 1000 utilizing optical processing equivalent to instantaneous laser frequency measurement, according to an embodiment, will now be discussed. For ease of illustration and understanding, much of the remaining structure and functioning of a LiDAR system with which the LiDAR chirp linearization system 1000 illustrated in FIG. 1 is utilized, is not illustrated nor described in any great detail. In that regard, it should be understood that an optical tap between the laser 1100 and the first splitter 1110 serves to reserve a relatively small but sufficient amount of optical power for linearization which is delivered to the splitter 1110 of the linearization system 1000, whereas most of the optical power is utilized as the laser output signal from the LiDAR system (not shown) for actual use in detection and raging. Accordingly, the laser 1100 is to be understood as being the primary ranging laser used in the LiDAR system for detecting and ranging, and that any one or more of the laser driver 1400, function generator 1300, and micro-processor/FPGA 1200 may be those same components normally found in the LiDAR system, configured and adapted according to the following, or may be additional components for the purposes of linearization only.

The tunable laser 1100 of the LiDAR system and the LiDAR chirp linearization system 1000, such as, for example a distributed Bragg reflector (DBR) laser, a distributed feedback (DFB) laser, an echelle grating laser, and lasers using an AWG for wavelength selection typically found integrated on PICs (Photonic IC), is optically coupled via waveguides and a tap (not shown) to a first optical splitter 1110 (1×2, 2×2 optical coupler, etc.) having one output optically coupled via a waveguide to a delay element 1120 (over the waveguide arm labeled "SIGNAL" in FIG. 1) and a second output optically coupled via a waveguide to a polarization controller 1130 (over the waveguide arm labeled "LO" in FIG. 1), for example a fiber squeezed or waveplate based polarization controller. The delay element 1120 may be any delay element with a free space group delay appropriate for generating an IF (intermediate frequency) signal, (as discussed below) and may be a delay line, such as, but not limited to, a winding integrated waveguide of a constant width or a winding wide multimode waveguide tapered (widened) to a narrower single mode waveguide before (after) it turns. In some implementations, such as an on-chip implementation using polarization-maintained waveguides, the polarization controller 1130 is not needed. The optical outputs from the delay element 1120 and the polarization controller 1130 are optically combined in an optical 90° hybrid unit 2000, illustrated and described below in connection with FIG. 2. Four signals are output from the optical 90° hybrid unit 2000, namely, a pair of I-channel signals I+, I−, and a pair of Q-channel signals Q+, Q−, over respective waveguides, the I+/I− pair coupled via a respective pair of waveguides to an I-channel receiver 1140, and the Q+/Q− pair coupled via a respective pair of waveguides to a Q-channel receiver 1150. The I-channel receiver 1140 and Q-channel receiver 1150, may, for example, include photodetectors, TIAs, and high speed ADCs (analog to digital converters). Electrical and typically digital outputs of the I-channel and Q-channel receivers are coupled to a micro-processor/FPGA 1200. The micro-processor/FPGA 1200 is electrically coupled to the function generator 1300 which is coupled to the laser driver 1400, which in turn is coupled to the laser 1100. It should be noted that the optical portion of the LiDAR chirp linearization system 1000, can be either built completely on an integrated photonics chip, or entirely using free space optical components (for example utilizing free space beam-splitters), or any combination of the two kinds of components. In that regard, in some embodiments, the waveguides between elements may or may not be present. It also should be noted that in some embodiments, the optical portion of the LiDAR chirp linearization system 1000 may be implemented entirely on an integrated photonics chip by using directional couplers, tapered couplers, or MMIs as splitters and combiners, micro-heaters as the phase shifters, and a long winding spiral waveguide for the delay element.

The LiDAR chirp linearization system 1000 functions to form a laser linearization loop that measures an instantaneous frequency of the chirped laser signal of the laser 1100, determines what non-linearities are exhibited by that chirped laser signal, and corrects its chirp linearity by updating the chirp profile of the digital chirp waveform used to drive the laser 1100.

The laser 1100 outputs a chirped laser signal, as driven by the digital chirp waveform used by the laser driver 1400 to drive or modulate the laser 1100. The first optical splitter 1110 receives the chirped laser signal from the laser 1100 via a tap (not shown) and splits the input laser power into a "LO" (local oscillator) signal and a "SIGNAL" signal over respective paths. If needed, the polarization controller 1130 is configured to ensure that the polarization on both the LO and the SIGNAL paths are identical at the I-channel receiver 1140 and the Q-channel receiver 1150. The optical signals traversing the SIGNAL path are delayed by the delay element 1120 which may be a delay line with an equivalent free space group delay of 0.1 to 5 meters, or any other delay value which is large enough to delay the optical signal enough to allow accurate I-channel and Q-channel detection of the IF signal discussed below, and small enough to lower the optical loss in the delay element. It should be noted that the delay element 1120 and the polarization controller may be interchanged on the LO and SIGNAL paths, or both may be present on a single LO or SIGNAL path, as long as there is an appropriate difference of delay between the two optical inputs to the optical 90° hybrid unit 2000, and a matching of polarization of the two optical inputs in the sense mentioned above. The optical SIGNAL and LO signals in which has been incorporated a delay and whose polarization have been controlled or maintained are input over the two inputs of the optical 90° hybrid unit 2000.

Figure 2:
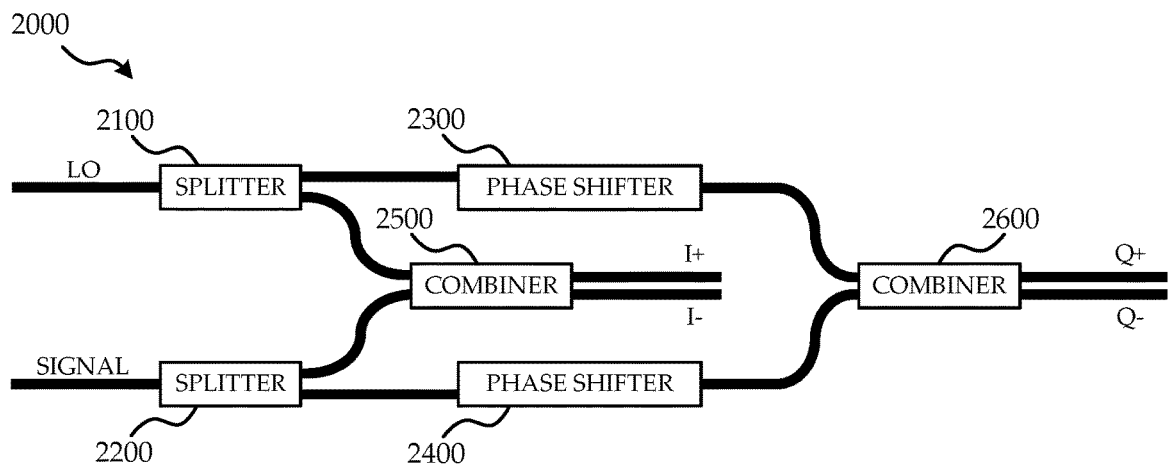
FIG. 2 illustrates an implementation of an optical 90° hybrid such as that shown in FIG. 1 according to an embodiment.

With reference to FIG. 2, the structure and function of an example optical 90° hybrid unit 2000 according to an embodiment will now be discussed.

Coupled to the LO signal path, a LO input of the optical 90° hybrid unit 2000 is optically coupled via a waveguide to a second optical splitter 2100 (1×2, 2×2 optical coupler, etc.), while coupled to the SIGNAL signal path, a SIGNAL input of the optical 90° hybrid unit 2000 is optically coupled via a waveguide to a third optical splitter 2200 (1×2, 2×2 optical coupler, etc.). A first output of the second optical splitter is optically coupled via a waveguide to a first phase shifter 2300 and a first output of the third optical splitter 2200 is optically coupled via waveguide to a second phase shifter 2400. Second outputs of each of the second and third optical splitters 2100 2200 are coupled via waveguides to a first combiner 2500 (e.g. a 2×2 MMI or a 50/50 directional coupler). Outputs of each of the first and second phase shifters 2300 2400 are coupled via waveguides to a second combiner 2600 (e.g. a 2×2 MMI or a 50/50 directional coupler). Each of the first and the second combiner 2500 2600 outputs a pair of optical signals, the first combiner 2500 outputting the pair of I-channel signals I+, I−, and the second combiner 2600 outputting the pair of Q-channel signals Q+, Q−.

The optical 90° hybrid unit 2000 functions to generate two combinations of an optical signal (LO) and a delayed version of that optical signal (SIGNAL). As a consequence of the delay between the LO and the SIGNAL signals, they have slightly different frequencies when combined in the optical 90° hybrid unit 2000, generating combinations exhibiting IF (intermediate frequency) signals. The optical 90° hybrid unit 2000 applies a relative optical phase shift to one of the combinations, for generating an I/Q signal pair having a 90° relative IF signal phase shift. The phase of the IF signal, which is directly related to the instantaneous frequency of the optical signal of the laser, is measured. It should be noted that although the instantaneous frequency of the laser may be numerically determined from the phase of the IF signal, since the phase of the IF signal is directly proportional to the instantaneous frequency, linearization can be performed with reference to the phase of the IF signal only, as described below, without any additional computation of actual frequency.

The optical signal (LO) traversing the LO input of the optical 90° hybrid unit 2000 is split into two signals by the first optical splitter 2100, while the delayed version of the optical signal (SIGNAL) traversing the SIGNAL input of the optical 90° hybrid unit 2000 is also split into two signals by the second optical splitter 2200. First versions of the delayed (SIGNAL) and undelayed (LO) optical signals are combined in the first combiner 2500 without any phase shifts applied thereto, whereas second versions of the delayed (SIGNAL) and undelayed (LO) optical signals each pass through a phase shifter prior to be being combined. The unshifted combination of optical signals emerge from the first combiner 2500 and the optical 90° hybrid unit 2000 as the I+/I− pair whereas the phase shifted combination of optical signals emerge from the second combiner 2600 and the optical 90° hybrid unit 2000 as the Q+/Q− pair.

The purpose the phase shifters 2300 and 2400 is to provide a 90° IF signal phase shift between the I+/I− channels and the Q+/Q− channels. In order for the IF signal of the Q+/Q− pair to have a relative IF signal phase shift of 90° with respect to the I+/I− pair, the optical phase shifts provided by the first phase shifter 2300 and the second phase shifter 2400 are arranged such that a difference between the optical phase shifts they each impart is the equivalent of a 90° optical phase shift. It is to be understood that in the context here, a relative phase difference of 90° is equivalent to any relative phase difference of 90°+n*360° (where n is an integer). For example, the first phase shifter 2300 may be set to shift the first output of the second splitter 2100 by a 180° optical phase shift, while the second phase shifter 2400 may be set to shift the first output of the third optical splitter 2200 by a 90° optical phase shift. The resulting IF signal of the Q+/Q− pair will therefore be shifted by a 90° IF frequency phase shift relative to the I+/I− pair. Since only the relative 90° IF signal phase shift between Q+/Q− and the I+/I− pairs is important, any combination of first and second phase shifters 2300 2400 which impart optical phase shifts which are separated by 90° in optical phase shift may be used. In some embodiments, only a single phase shifter with an optical phase shift of 90° is utilized (either on the upper LO or lower SIGNAL path in FIG. 2). However, in such embodiments the absence of a phase shifter on the other of either the upper or lower path introduces an amplitude imbalance, so in some embodiments both phase shifters 2300 2400 are present even if one is only a "dummy phase shifter" (set to 0°) which does not change the phase while still introducing a balancing loss. To get a perfect I/Q signal, the phase shifters need to provide a precise 90° IF phase offset for the Q+/Q− channel from the I+/I− channel. In practice, this is fine-tuned after the device is manufactured. It should be noted also, that since Q+/Q− signals differs from the I−/I+ signals only in their relative IF phase, labels in FIG. 2 could be reversed and phase shifts inverted, or the positions of the phase shifters 2300 2400 shifted to the waveguides leading to the first combiner 2500, while inverting the phase shifts, and other similar permutations understood by one skilled in the art. In general any one or more of all four optical signals leaving the first and second splitters 2100 2200 could be phase shifted appropriately to generate the I+/I− and Q+/Q− signals.

Since the 90° relative phase of the combined optical signals caused by the phase shifters causes a 90° relative shift in the resultant IF signal in the output of the combiner, a usable I/Q signal pair of IF signals is produced independent of the actual difference in frequency, which as a consequence of any non-linearity in the actual chirp segment, varies. At times when the resulting chirp segment in the output signal deviates markedly from the desired chirp signal, especially near the chirp segment edges, this is particularly useful since it allows measurement of the actual instantaneous IF phase which corresponds to the actual instantaneous optical frequency.

As should be apparent from the foregoing, the optical 90° hybrid unit 2000 functions to generate I and Q channel versions of IF signals resulting from combinations of undelayed and delayed signals.

The I+/I− and Q+/Q− signal pairs output from the optical 90° hybrid unit 2000 are measured by the I-channel and Q-channel receivers (1140 and 1150), which convert the optical I and Q signals into digital electrical signals which are then forwarded on to the mircro-processor/FPGA 1200. In some embodiments, the I-channel and Q-channel receivers 1140 1150 include photodetectors for converting optical power into currents, transimpedance amplifiers (TIAs) for converting currents into voltage, and analog to digital converters (ADCs) for generating the digital data from the voltages. The I/Q detection, in particular, analysis of the instantaneous phase of the IF signal, provides very accurate measurement corresponding directly to the instantaneous frequency, which forms the basis of the linearization process. The micro-processor/FPGA 1200 determines a new pre-distorted digital chirp waveform which results in improved linearization of the optical output of the laser 1100, described in more detail below in connection with FIG. 3. In some embodiments the micro-processor/FPGA 1200 feeds the new digital chirp waveform (formatted and/or converted as required) to and cooperates with a function generator 1300 to control the laser driver 1400 to modulate the laser 1100 in accordance with the new pre-distorted digital chirp waveform. The function generator 1300 stores a buffered waveform which is to be provided to the laser driver 1400 which produces an instantaneously changing analog drive current (or voltage) to modulate the frequency of the laser 1100.

The function generator 1300 stores the entire periodic chip profile as a digital chirp waveform, for example, a digital chirp waveform corresponding to and for generating chirp segments 1, 2, 3, and 4 in FIG. 4, and outputs the buffered (and replayed) waveform to the laser driver 1400 for modulating the laser 1100 during active operation of the LiDAR system. In some embodiments the function generator 1300 is part of and/or integrated with the micro-processor/FPGA 1200 and in others the function generator 1300 is part of and/or integrated with the laser driver 1400.

In some embodiments, instead of balanced I-channel and Q-channel receivers 1140 1150, unbalanced I-channel and Q-channel receivers 1140 1150 are utilized, each of which only accepts a single unbalanced input. In those embodiments, only a single output of each of the first and second combiners 2500 2600 is output from the optical 90° hybrid unit 2000 as respective single unbalanced I+ and Q+ signals (or unbalanced I− and Q− signals) for detection by the respective unbalanced I-channel and Q-channel receivers 1140 1150. It is to be understood, that even in the case of balanced I-channel and Q-channel receivers 1140 1150, imbalances may exist between I− and I+ or Q− and Q+, in the optical pathways leading up to the receivers 1140 1150 or may be caused by the receivers 1140 1150 themselves. In most cases, any unwanted imbalances can be mitigated by processing in the micro-processor/FPGA (1200).

Figure 3:
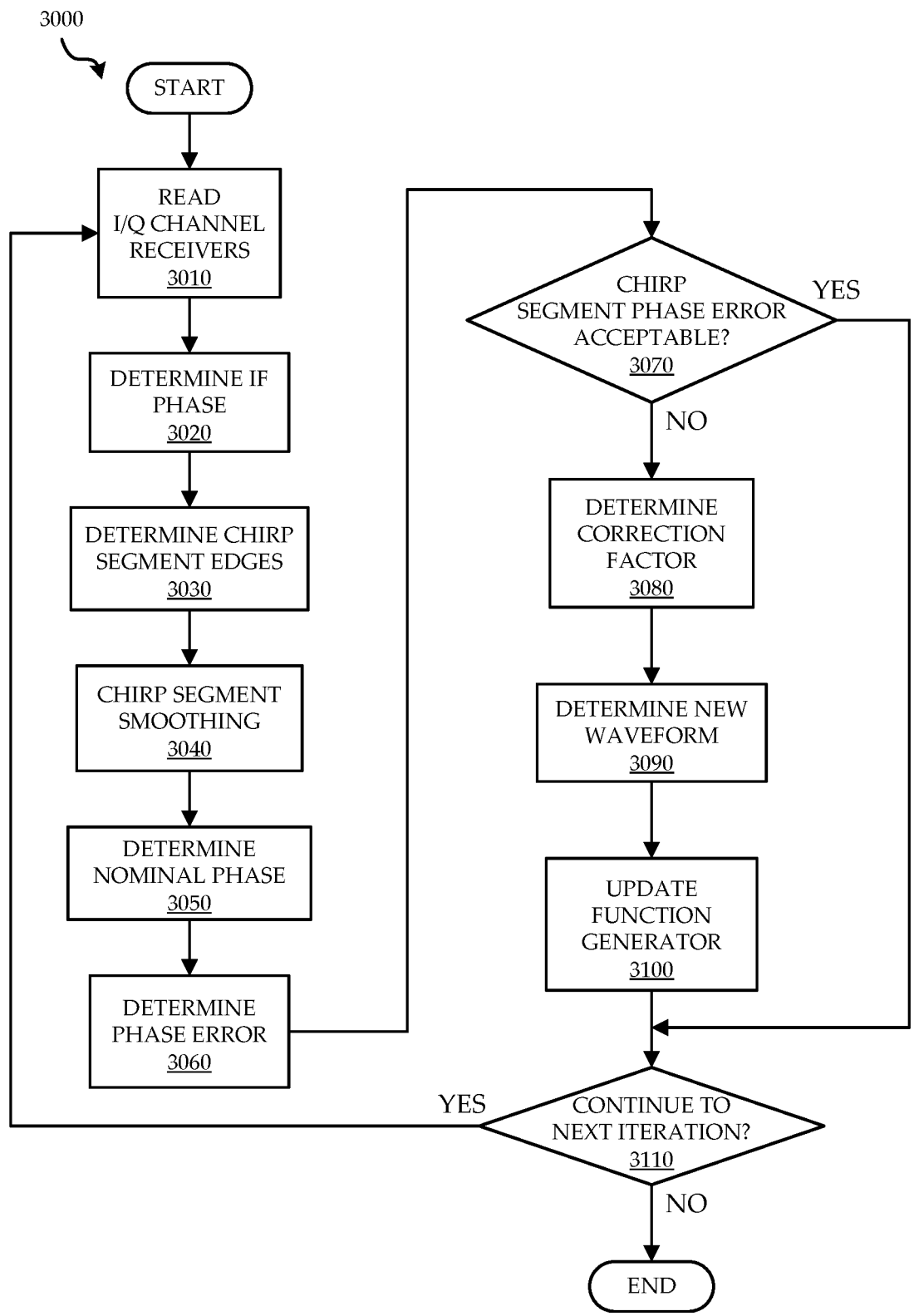
FIG. 3 is a block diagram of a process for implementing pre-distorted laser linearization in a LiDAR system according to an embodiment.

With reference to FIG. 3, an example process 3000 of pre-distortion to improve linearization of the chirped optical signal output from the laser 1100 according to an embodiment will now be discussed.

The process 3000 shown in FIG. 3 may be run parallel to the normal operation of the LiDAR system, that is, while all of the structure and functions to perform the detection and ranging of the LiDAR system (not shown) are on-line. The loop of the process 3000 of FIG. 3 serves to analyze and linearize an entire chirp profile such as chirp segments 1-4 of FIG. 4, and may be repeated as outlined below. It should be noted, that due to the steps of the linearization process 3000 of FIG. 3, the block of data read from the I and Q-channel receivers should include enough to ensure an entire chirp profile is captured, plus an amount sufficient for smoothing and determining the edges of the chirp segments as described below. In some embodiments, the amount of data received from the I-channel and Q-channel receivers 1140 1150 corresponds to the amount of data for a duration of 1.5-3 times the entire chirp period of the chirp profile.

In some embodiments a micro-processor/FPGA such as the one shown in FIG. 1 performs all of the steps of the linearization process 3000 of FIG. 3. Due to the non-linearities in the relationship between the chirp waveform and the resulting chirp profile produced by the laser 1100, which is why correction is required at all, in general the exact effect of any adjustment of the digital chirp waveform is not known, hence, linearization often involves multiple iterations of the entire process 3000.

The linearization process 3000 may be performed as a calibration and the pre-distorted digital chirp waveform stored in a persistent memory store, such as in the function generator 1300 or elsewhere (storage step not explicitly shown). Such calibrations could be performed, for example, at the time of fabrication of the LiDAR system, during periodic and/or regular intervals during the operational lifetime of the LiDAR system, or at system start-up just prior to active use of the LiDAR system, and/or periodically or continually during a session of use of the LiDAR system in the field. The values which exhibit improved linearization may also be calibrated and stored in a look up table (LUT) shipped with the LiDAR system, the LUT containing separate pre-distorted chirp profiles customized for different possible external conditions, such as for different temperature ranges, or for particular temperatures. When operating the LiDAR system under particular external condition, the range in the LUT in which the particular condition falls, or the particular value in the LUT the condition is closest to, is used to look-up and fetch the pre-distorted digital chirp profile corresponding that particular external condition. In some embodiments, these profiles may be updated or custom profiles may be added by the user or the LiDAR system to the LUTs, over the lifetime of the LiDAR system. In some embodiments, the linearization process can be performed in real-time, in which the I/Q data is collected in real time while the LiDAR system is actively operating to perform detection and ranging. In such an embodiment, the digital chirp waveform is updated as soon as the linearization on all chirp segments is complete (or acceptable), and thereafter, may be repeated indefinitely while the LiDAR system is in operation to maintain and/or continuously improve linearization.

First, at 3010 the digital I/Q data from the I-channel and Q-channel receivers 1140 1150 is read until a block of data of sufficient duration has been read and stored, for example, as a series of data points stored in an array or memory. The instantaneous phase of the I/Q signal (intermediate frequency (IF) signal) representing the instantaneous laser frequency, is determined at 3020 from the data points for example by calculating the instantaneous IF phase=Arctan (Q/I). This is performed for all the data points of all the chirp segments of the block. At this point it should be emphasized that the phase of the IF signal, corresponds to the instantaneous optical frequency as in the following equation:

$$\varphi_{IF}=2\pi\tau f_{laser} \qquad (1)$$

Where $\varphi_{IF}$ is the instantaneous phase of the IF signal, $\tau$ is the group delay time for the delay element and $f_{laser}$ is the instantaneous frequency of the laser 1100. Since the IF phase $\varphi_{IF}$ fuser directly corresponds to the instantaneous optical frequency, when the chirp direction changes i.e. when the slope in the optical frequency versus time changes sign, the sign of the slope of the IF phase versus time also changes sign and hence momentarily becomes zero.

The chirp segment edges or end points within the block are then determined at 3030 (see FIG. 4, which illustrates multiple chirp segments of various bandwidths and chirp segment durations) by finding the zero-crossing points of the gradient (slope) of a smoothed version of the IF phase. Since there could be appreciable noise in the data due to noise sources that are irrelevant to the chirp non-linearity (such as the laser phase noise, the receiver noise, and the function generator noise), in some embodiments a heavy smoothing is applied to a temporary copy of the IF phase to remove them in the process of determining the chirp segment edges. The smoothing algorithm can be any kind of digital low pass filter such as a moving average or a low polynomial order (e.g. n=1 to 5) Savitzky-Golay filter, with its window size defined by the user to optimize efficiency and accuracy, etc. In a typical chirped LiDAR signal there will be multiple zero-crossing points in the slope of the IF phase corresponding to different turning points at the edges of each chirp segment. In some embodiments, one of the zero-crossing points is arbitrarily assigned to be the start point of a repeated chirp profile (usually the one that corresponds to the start of the first chirp segment in the buffer of the Function Generator 1300), for example the first zero point at the beginning of the chirp profile including segments 1, 2, 3, and 4, together having a chirp period as illustrated in FIG. 4. In some embodiments, the gradient (slope) of the smoothed version of the IF phase is itself smoothed prior to finding the zeros.

In some embodiments, in which a floating nominal is used (see below), from this start point, and proceeding through the block, each chirp segment of the chirp profile of the block is isolated into individual IF phase segments based on the found zero crossing points.

In some embodiments, in which a fixed nominal is used (see below), from the start point the remaining edges of the chirp profile are determined from a set of user defined data which fixes them in relation to the start point. In some embodiments, in addition to the start point, an end point is determined, and the remaining edges of the chirp profile are determined from a set of user defined data which fixes the edges based on both the start point and the end point. For example, if the block included four chirp segments of equal lengths, the start edge and end edge of the group of four chirp segments would be determined with zero crossing points as outlined above, but the edges between the chirp segments could be calculated, according to user defined data, as being at the one fourth, one half, and three fourths points along the entire group of four chirp segments.

In some embodiments, rather than determining the chirp segment edges from the IF phase data, the step of determining the chirp segment edges 3030 uses external data such as an external clock to correlate points in the stored IF phase data with known edges of the chirp segments.

Each chirp segment is then separately smoothed at 3040 with a digital low pass filter which may be the same as or different from that used to determine the chirp edges in 3030, but which is performed treating the ends of the chirp segments as fixed limits. In some embodiments a Savitzky-Golay filter with no extension and of polynomial order of three may be used, to better match edge behavior of a thermally induced delay response.

Once the edges for the chirp segments of a chirp profile within the block have been determined, and the chirp segments smoothed, the nominal phase for each data point of each chirp segment is determined at 3050. The nominal phase represents the desired chirp waveform against which the measured values are compared.

In some embodiments a fixed nominal is determined. The starting nominal value for the chirp segment is taken from the first value of the smoothed IF phase for the chirp segment. The end nominal value for the chirp segment is then determined from the desired IF phase shift for this chirp segment which is added to the starting nominal value of the IF phase for the chirp segment. For chirp segments ramping up, the desired phase shift is positive, whereas for chirp segments ramping down the desired phase shift is negative. The desired IF phase shift can be calculated from the desired frequency shift of the chirp segment and equation (1). The nominal phase for the next chirp segment, and the subsequent segments, are calculated based on the last point of the previous segment's nominal phase plus the desired IF phase. Accordingly, an embodiment utilizing a fixed nominal approach, optimizes chirp linearity with a fixed array of all the nominal chirp values, on the basis of fixed chirp segment bandwidths.

In some embodiments, a floating nominal approach is utilized. In these embodiments the starting and end nominal values for a chirp segment are taken from the smoothed IF phase of the chirp segment end points, and the nominal values in-between these end points are linearly interpolated. It should be noted, since the end points of each chirp segment are defined by the zeros of the smoothed IF phase, these starting and end nominal values for a chirp segment correspond to the maximum and minimum (or vice versa) of the smoothed IF phase of the chirp segment. Accordingly, an embodiment utilizing a floating nominal approach optimizes linearity, but does not fix the chirp waveform to specific absolute phase points, nor any fixed chirp segment bandwidth. In some embodiments involving multiple iterations, the starting and end nominal values for a chirp segment are determined from a weighted average of the smoothed IF phase of the chirp segment end points of current and previous iterations.

Once the nominal phase for every data point of each chirp segment is determined or retrieved at 3050, the phase error profile for every data point of each chirp segment is calculated at 3060. For each data point of each chirp segment, the phase error is determined as:

$$\text{Phase Error} = \text{Nominal Phase} - \text{Smoothed IF Phase} \qquad (2)$$

The standard deviation of this phase error for each chirp segment (or a portion thereof) can then be used as a metric to determine whether the chirp segment is linear enough at branch point 3070 where each chirp segment is treated separately and may proceed along different branches. If the standard deviation of the phase error for a particular chirp segment (or a portion thereof) is below a certain threshold defined by the user, then the process determines that the chirp segment is acceptable and no correction is performed for that chirp segment. In some embodiments, the standard deviation of the phase error for only a portion of each chirp segment (for example, the middle portion of each chirp segment) is used as the metric. In some embodiments, the standard deviation of a weighted phase error, in which the phase error of each point along at least a portion of the chirp segment is weighted by a weighting function, is used as the metric. In some embodiments, instead of the phase error being calculated from a difference between the nominal phase and the smoothed IF phase, the phase error is determined as a ratio between the nominal phase and the smoothed IF phase.

If the standard deviation of the phase error for a particular chirp segment is above the user defined threshold, then branching point 3070 determines that the phase error is unacceptable, and the linearization process continues to calculate new data for the chirp segment of the digital chirp waveform to replace that currently used by the function generator. First, a correction factor is determined at 3080 for every data point in the chirp segment, determined as:

$$\text{Correction Factor} = \text{Phase Error} * \text{Sensitivity} \qquad (3)$$

In some embodiments, sensitivity is a user defined constant similar to the gain of a feedback loop. This is particularly applicable when the entire linearization process 3000 is repeated iteratively to optimize linearity. In some embodiments, this constant is different for different chirp segments of the chirp profile. For example, chirps with higher bandwidth could have lower sensitivity. In embodiments with multiple iterations, the sensitivity may also be set and adjusted to control a speed of convergence. In some embodiments, rather than a constant, the sensitivity may vary as a function of the slope of the IF phase, proximity to the initial or trailing edges of the chirp, the sign of the gradient etc. In other embodiments, the correction factor is a function of the phase error which has been determined to converge towards the ideal value in fewer iterations. In some embodiments, such as those with a phase error determined from a ratio, a dimensionless and/or multiplicative correction factor is determined.

Once correction factors for every data point of the chirp segment have been determined, a new digital chirp waveform is determined at 3090 from this correction factor for each chirp segment according to:

New Waveform=Old Waveform+Correction Factor (4)

The new digital chirp waveform data here are stored in units related to IF phase, but must be converted into waveform data appropriate for use in the function generator 1300 prior to transfer. In some embodiments which utilize a phase error in the form of a ratio and a dimensionless multiplicative correction factor is utilized, the old waveform is multiplied by the correction factor, and is replaced with the result. In some embodiments, the value chosen for the sensitivity or in general, the correction factor determination, takes into account the units and/or formats (e.g. various bit formats) such that the correction factor may be added directly to the waveform data in the function generator 1300 rather than replacing it. In some embodiments, values falling outside of the range acceptable to the function generator 1300 are fixed at the minimum or maximum acceptable value.

The new digital chirp waveform data for each chirp segment whose phase error was not acceptable are thus corrected, converted, and then updated in the function generator at 3100, while the digital chirp waveform data in the function generator associated with any chirp segments of the chirp profile whose error was acceptable remains unchanged.

Once all the chirp segments of the chirp profile has gone through the branching point process 3070, the process checks at 3110 whether to subject the chirp profile to another iteration of the entire process 3000: if "Yes", the process 3000 returns to 3010 reading the digital I/Q data from the I-channel and Q-channel receivers 1140 1150; if "No", the process 3000 ends. In some embodiments the process always answers 3110 in the affirmative, repeating the process 3000 loop indefinitely until a user overrides and ends the process 3000. In some embodiments, a counter is utilized to count a predetermined fixed number of loops the process 3000 is to go through. In other embodiments, the linearization process 3000 is performed iteratively to continuously improve the linearity the pre-distorted digital chirp waveform, and is repeated until: 1) the standard deviation of the phase error for each chirp segment has converged and fluctuates at a very small value defined by the user, or 2) the standard deviation reaches a satisfactory lower threshold value, also defined by the user, or may be repeated until any other criteria regarding the phase error and its level or convergence is satisfied. In some embodiments combinations of the above mentioned conditions are utilized in 3110 to determine whether to continue to another iteration or end the process.

Although the branching process 3070 of FIG. 3 has been described as being based on a standard deviation of the phase error for a chirp segment, other criteria may be used to determine whether a particular chirp segment is linear enough, and hence to decide whether correction is to be performed. In contexts where multiple iterations are performed, the criteria for convergence could be determined separately and tracked for each chirp segment. In such embodiments, chirp segments which have met a convergence criteria iteration to iteration (e.g. fluctuates at a very small value defined by the user) are deemed to have acceptable phase error for the purposes of 3070. In some embodiments, both criteria of convergence and standard are used by branching process 3070.

Although the branching process 3070 of FIG. 3 has been described as treating each chirp segment separately, in some embodiments, branching process 3070 evaluates whether or not the phase error for every chirp segment is acceptable, and if the phase error for any chirp segment is not acceptable, the linearization process continues to calculate new data for all of the chirp segments. In some embodiments, for example when a predetermined fixed number of loops or iterations of the process 3000 are to be performed, branching process 3070 can be entirely eliminated, and the process 3000 may proceed directly from the step of determining the phase error 3060 to the step of determining the correction factor 3080 for all chirp segments.

Although the branching process 3070 of FIG. 3 has been described as treating each chirp segment according to a metric characterizing the phase error of each separate chirp segment, in some embodiments, branching process 3070 evaluates a single metric characterizing the phase error of all of the chirp segments collectively, and determines whether or not the phase error for all chirp segments as a whole is acceptable. In such embodiments, all chirp segments either collectively undergo linearization or not.

Although the linearization process 3000 described above includes heavy smoothing of the IF phase data in the step of determining the chirp edges 3030, in some embodiments, in determining the IF phase 3020, some smoothing is applied separately to the I and Q data prior to calculating the IF phase according to the formula above. In such embodiments, the amount of smoothing in the step of determining the chirp edges 3030 and smoothing the chirp segment 3040 may be reduced or appropriately altered.

It should be understood that given the possibility of differences between sampling rates for the I-channel and Q-channel receivers 1140 1150 versus the data update rate of the function generator 1300, interpolation as and when necessary is applicable.

It is to be understood, that the component parts of the LiDAR system and the LiDAR linearization system 1000 with which it cooperates, may operate as part of a single instrument or device or may operate as part of a multiplicity of interconnected devices working together in proximity or remotely, or any combination thereof.

The above described linearization process 3000 may be performed by a processing device such as the micro-processor/FPGA 1200 of FIG. 1 or any one or more other similar device, which may be implemented using one or more application specific integrated circuits (ASIC), microcontrollers, general purpose computer systems, digital signal processors, programmable logic devices (PLD), field programmable logic devices (FPLD), and the like, programmed according to the teachings as illustrated and described herein, as will be appreciated by those skilled in the optical, networking, software and computing arts.

In addition, two or more computing systems or devices may be substituted for any one of the processors or controllers described herein. Accordingly, principles and advantages of distributed processing, such as redundancy, replication, and the like, also can be implemented, as desired, to increase the robustness and performance of processors or controllers described herein.

The operation of the example linearization methods may be performed by machine readable instructions. In these examples, the machine readable instructions comprise an algorithm for execution by: (a) a processor, (b) a controller, and/or (c) one or more other suitable processing device(s). The algorithm may be embodied in software stored on tangible media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or dedicated hardware in a well-known manner (e.g., it may be implemented by an application specific integrated circuit (ASIC), a programmable logic device (PLD), a field programmable logic device (FPLD), discrete logic, etc.). For example, any or all of the component processes or steps of the linearization methods could be implemented by software, hardware, and/or firmware. Also, some or all of the machine readable instructions represented may be implemented manually.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A system for LiDAR (light detection and ranging) chirp signal linearization comprising:
    a first splitter for splitting a chirped laser signal from a laser into two optical signals;
    an optical delay element for imparting a known delay on one of the two optical signals generating a delayed optical signal, the other of the two optical signals an undelayed optical signal; and
    an optical 90° hybrid for
        receiving said undelayed and delayed optical signals, and
        generating a first IF optical signal output and a second IF optical signal output from said undelayed and delayed optical signals,
    wherein said generating imparts a 90° relative IF phase shift between the first and second IF optical signal outputs, the first and second IF optical signal outputs corresponding to I/Q channels of an IF optical signal of a combination of the undelayed and delayed optical signals.

2. The system of claim 1, further comprising an I-channel receiver and a Q-channel receiver pair for receiving the first and second IF optical signal outputs, and generating I-channel and Q-channel digital data.

3. The system of claim 2, further comprising:
    a processing and driving circuit for
        receiving the I-channel and Q-channel digital data,
        determining an instantaneous phase of the IF optical signal from the I-channel and Q-channel digital data,
        pre-distorting digital chirp waveform data with use of the instantaneous phase of the IF optical signal
        generating new pre-distorted digital chirp waveform data for driving the laser to produce the chirped laser signal with improved linearity, and
        driving the laser with the new pre-distorted digital chirp waveform.

4. The system of claim 3, wherein the processing and driving circuit's pre-distorting the digital chirp waveform further comprises:
    determining edges of a chirp segment;
    determining whether a phase error for the chirp segment is acceptable;
    and for a chirp segment whose phase error is not acceptable,
        generating said new pre-distorted digital chirp waveform data for every data point of the chirp segment.

5. The system of claim 4, wherein determining edges of a chirp segment includes:
    smoothing a copy of the instantaneous phase of the IF optical signal;
    determining a gradient of the smoothed copy of the instantaneous phase of the IF optical signal; and
    determining the edges of the chirp segment from zeros of the gradient.

6. The system of claim 4, wherein determining whether a phase error for the chirp segment is acceptable includes:
    performing a smoothing of the instantaneous phase of the IF optical signal for the chirp segment generating a smoothed instantaneous phase of the IF optical signal for every data point of the chirp segment;
    determining a nominal phase for every data point of the chirp segment;
    determining a phase error for every data point of the chirp segment with use of the nominal phase and the smoothed instantaneous phase of the IF optical signal;
    using a metric, assigning a single value characterizing the phase error for at least a portion of the chirp segment; and
    comparing the single value with an acceptability threshold,
and wherein generating said new pre-distorted digital chirp waveform data for the chirp segment includes:
    determining a correction factor for every data point of the chirp segment with use of the phase error; and
    determining new pre-distorted chirp waveform data with use of current chirp waveform data and the correction factor.

7. The system of claim 6, wherein smoothing the copy of the instantaneous phase of the IF optical signal comprises heavy Savitzky-Golay filtering, wherein performing the smoothing of the instantaneous phase of the IF optical signal for the chirp segment comprises Savitzky-Golay filtering with no extension and a polynomial order of three, wherein the metric is the standard deviation of a weighted phase error for at least a portion of the chirp segment, wherein the correction factor is directly proportional to the phase error, and wherein determining new pre-distorted chirp waveform data includes adding the current chirp waveform data to the correction factor.

8. The system of claim 1, wherein the optical 90° hybrid comprises:
    respective first and second splitters for splitting each of the undelayed and delayed optical signals into respective first and second undelayed optical signals and first and second delayed optical signals;
    respective first and second combiners for combining the first undelayed and delayed optical signals to generate the first IF optical signal output and combining the second undelayed and delayed optical signals to generate the second IF optical signal output; and at least one phase shifter for phase shifting one or more of the first delayed optical signal, the second delayed optical signal, the first undelayed optical signal, and the second undelayed optical signal.

9. The system of claim 8, wherein the at least one phase shifter comprises:
a first phase shifter for imparting a first optical phase shift to the first undelayed optical signal; and
a second phase shifter for imparting a second optical phase shift to the first delayed optical signal,
wherein the first optical phase shift and the second optical phase shift differ by the equivalent of a 90° relative optical phase difference.

10. The system of claim 4, wherein determining whether a phase error for the chirp segment is acceptable comprises evaluating a convergence of the phase error for the chirp segment with use of a metric characterizing the phase error for at least a portion of the chirp segment iteration by iteration.

11. A method for LiDAR (light detection and ranging) chirp signal linearization, the method comprising:
splitting a chirped laser signal from a laser into two optical signals;
imparting a known delay on one of the two optical signals generating a delayed optical signal using an optical delay element, the other of the two optical signals an undelayed optical signal; and
generating a first IF optical signal output and a second IF optical signal output from said undelayed and delayed optical signals,
wherein said generating imparts a 90° relative IF phase shift between the first and second IF optical signal outputs, the first and second IF optical signal outputs corresponding to I/Q channels of an IF optical signal of a combination of the undelayed and delayed optical signals.

12. The method of claim 11, further comprising receiving the first and second IF optical signal outputs, and generating I-channel and Q-channel digital data.

13. The method of claim 12, further comprising:
receiving the I-channel and Q-channel digital data,
determining an instantaneous phase of the IF optical signal from the I-channel and Q-channel digital data,
pre-distorting digital chirp waveform data with use of the instantaneous phase of the IF optical signal generating new pre-distorted digital chirp waveform data for driving the laser to produce the chirped laser signal with improved linearity, and
driving the laser with the new pre-distorted digital chirp waveform.

14. The method of claim 13, wherein pre-distorting the digital chirp waveform further comprises:
determining edges of a chirp segment;
determining whether a phase error for the chirp segment is acceptable;
and for a chirp segment whose phase error is not acceptable,
generating said new pre-distorted digital chirp waveform data for every data point of the chirp segment.

15. The method of claim 14, wherein determining edges of a chirp segment includes:
smoothing a copy of the instantaneous phase of the IF optical signal;
determining a gradient of the smoothed copy of the instantaneous phase of the IF optical signal; and
determining the edges of the chirp segment from zeros of the gradient.

16. The method of claim 14, wherein determining whether a phase error for the chirp segment is acceptable includes:
performing a smoothing of the instantaneous phase of the IF optical signal for the chirp segment generating a smoothed instantaneous phase of the IF optical signal for every data point of the chirp segment;
determining a nominal phase for every data point of the chirp segment;
determining a phase error for every data point of the chirp segment with use of the nominal phase and the smoothed instantaneous phase of the IF optical signal;
using a metric, assigning a single value characterizing the phase error for at least a portion of the chirp segment; and
comparing the single value with an acceptability threshold,
and wherein generating said new pre-distorted digital chirp waveform data for the chirp segment includes:
determining a correction factor for every data point of the chirp segment with use of the phase error; and
determining new pre-distorted chirp waveform data with use of current chirp waveform data and the correction factor.

17. The method of claim 16, wherein smoothing the copy of the instantaneous phase of the IF optical signal comprises heavy Savitzky-Golav filtering, wherein performing the smoothing of the instantaneous phase of the IF optical signal for the chirp segment comprises Savitzky-Golav filtering with no extension and a polynomial order of three, wherein the metric is the standard deviation of a weighted phase error for at least a portion of the chirp segment, wherein the correction factor is directly proportional to the phase error, and wherein determining new pre-distorted chirp waveform data includes adding the current chirp waveform data to the correction factor.

18. The method of claim 11, wherein said generating the first IF optical signal output and the second IF optical signal output from said undelayed and delayed optical signals comprises:
receiving said undelayed and delayed optical signals,
splitting each of the undelayed and delayed optical signals into respective first and second undelayed optical signals and first and second delayed optical signals,
phase shifting one or more of the first delayed optical signal, the second delayed optical signal, the first undelayed optical signal, and the second undelayed optical signal,
combining the first undelayed and delayed optical signals to generate a first IF optical signal output, and
combining the second undelayed and delayed optical signals to generate a second IF optical signal output.

19. The method of claim 18, wherein said phase shifting further comprises:
imparting a first optical phase shift to the first undelayed optical signal,
imparting a second optical phase shift to the first delayed optical signal,
wherein the first optical phase shift and the second optical phase shift differ by the equivalent of a 90° relative optical phase difference.

20. The method of claim 14, wherein determining whether a phase error for the chirp segment is acceptable comprises evaluating a convergence of the phase error for the chirp segment with use of a metric characterizing the phase error for at least a portion of the chirp segment iteration by iteration.

* * * * *